July 18, 1939.    J. H. SCHAPLEIGH    2,166,611
SYNTHESIS OF AMMONIA FROM ITS ELEMENTS
Filed Oct. 20, 1937
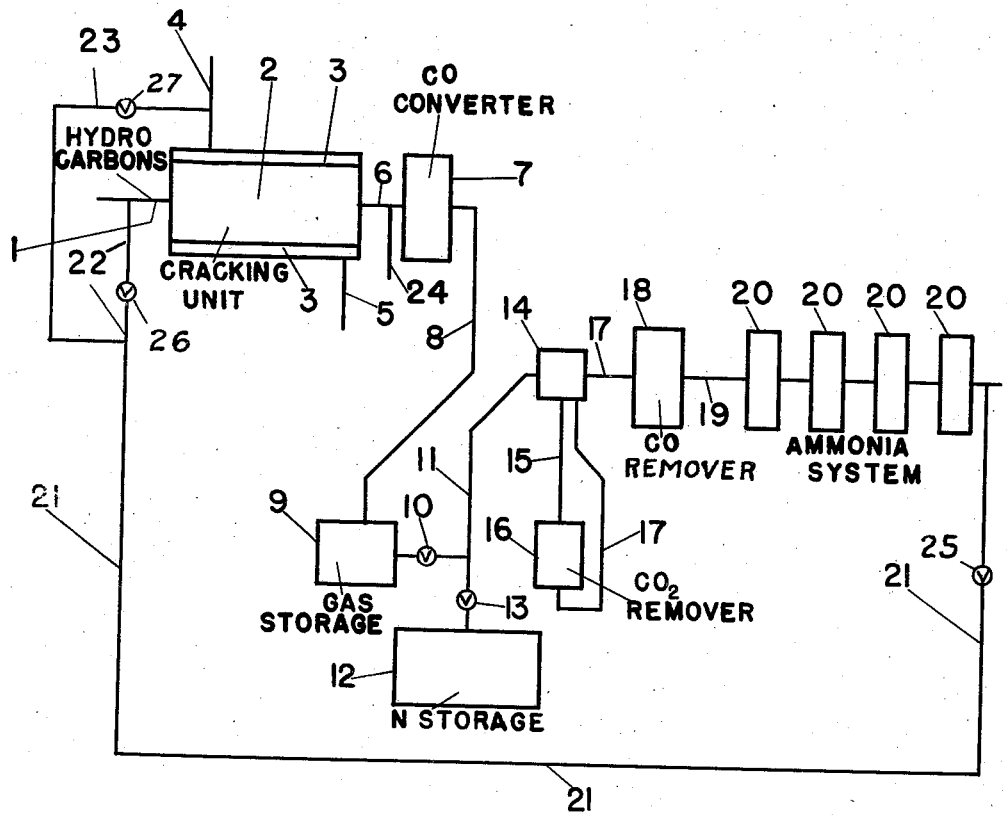
INVENTOR
James H. Shapleigh
BY Edward B. Beale
ATTORNEY Patented July 18, 1939

2,166,611

UNITED STATES PATENT OFFICE 2,166,611

SYNTHESIS OF AMMONIA FROM ITS ELEMENTS

James H. Shapleigh, Wilmington, Del., assignor to Hercules Powder Company, Wilmington, Del., a corporation of Delaware Application October 20, 1937, Serial No. 170,100

2 Claims. (Cl. 23—199)

This invention relates to the synthesis of ammonia from its elements.

In the synthesis of ammonia from its elements, purified hydrogen and purified nitrogen are passed through a suitable catalyst, at a suitable temperature, the ammonia formed is then removed from the excess of unconverted gases, and the unconverted gases recirculated through the catalyst to give further conversion thereof to ammonia.

Usually, such hydrogen and nitrogen used for conversion into ammonia are highly purified to remove therefrom inert and poisonous gases, e. g., hydrocarbons, carbon dioxide, oxygen, water vapor, hydrogen sulfide and carbon monoxide. When harmless, inert gases are allowed in the ammonia system, their content rarely exceeds 2%.

When hydrogen, for use in the synthesis of ammonia, is prepared from gases which initially contain substantial amounts of inert gases, such contaminated hydrogen is usually washed with liquid nitrogen, to yield substantially pure nitrogen-hydrogen gas. Such a method is expensive and uneconomical.

Another method of preparing hydrogen, for use in ammonia synthesis, has been to crack a hydrocarbon gas, with or without the use of steam, and with or without the use of a catalyst, into hydrogen gas, which will be contaminated with unchanged hydrocarbon, which is inert as regards ammonia synthesis. When such a hydrocarbon-contaminated hydrogen is mixed with nitrogen, for the purpose of forming a raw material for the synthesis of ammonia, such a mixture of hydrogen and nitrogen may contain up to 5–10% of inert gases, principally methane.

When using in ammonia synthesis a hydrogen/nitrogen mixture containing 5–10% of inert hydrocarbons, e. g. methane, ethane, propane, etc., principally methane, as the hydrogen and nitrogen disappear therefrom, to form ammonia, which ammonia is removed from the system, the proportion of inert hydrocarbons in the recirculating mixture increases. To prevent undue and harmful concentration of such inert hydrocarbons in the recirculating hydrogen/nitrogen mixture, it becomes necessary to bleed off a quantity of gas containing the inert hydrocarbons, hydrogen and nitrogen, with accompanying economic loss.

I have found that such uneconomical bleeding or purging to the atmosphere, with consequent wastage of valuable components of the recirculating mixture, can be avoided by a very simple, economical, and inexpensive means.

By way of example, in the carrying out of my process, in an ammonia synthesis system operating under a pressure of about 1000 atmospheres, and with hydrogen obtained by cracking hydrocarbon gases, and with recirculation of such gases after removal therefrom of the ammonia which has formed, I continue operation until the proportion of inert hydrocarbon in the recirculating gas mixture reaches about 15–30% by volume of methane and other hydrocarbons. Then in accordance with my invention, I remove from the recirculating gas mixture such a proportion thereof as will maintain the hydrocarbon content thereof at about 15–30%, and pass the removed gas mixture containing, as stated above, about 15–30% hydrocarbons, into a hydrocarbon cracking unit, where it is mixed with fresh hydrocarbons and its hydrocarbon content cracked to hydrogen, carbon and carbon monoxide. It will be appreciated that, in so doing, the hydrogen and nitrogen content of the removed gas will simply pass through the cracking unit without change and will mix with the rest of the process gas, thus conserving, instead of wasting as heretofore, not only the hydrocarbon content of the bled gases, but also the hydrogen and nitrogen content thereof.

As a further example of the carrying out of my process in an ammonia synthesis system operating under about 250 atmospheres pressure, and with hydrogen obtained by cracking hydrocarbon gases, and with recirculation of such gases after removal therefrom of the ammonia which has formed, I continue the operation until the proportion of inert hydrocarbon gas in the recirculating mixture reaches about 30% by volume of methane and other hydrocarbons. I then remove from the recirculating gases such a proportion thereof as will maintain the hydrocarbon content thereof at about 15–30%, and pass the removed gas mixture, containing about 15 to 30% hydrocarbons, to a hydrocarbon cracking unit until, where, as heretofore described, it is cracked, the cracked gases and the hydrogen and nitrogen content passes back to the process gas in the ammonia synthesis system, and operations are continued as before.

Similarly, I may operate my ammonia synthesis system at about 600 to about 2500 atmospheres pressure until the hydrocarbon content of the recirculating gases has reached about 15 to about 30% by volume, then bleed off gases until the hydrocarbon content of the recirculating gas is maintained at about 15% to about 30% by volume of hydrocarbons, then pass the bled gases to the hydrocarbon cracking unit and continue the operation as hereinbefore described.

I am aware that recirculation of the unconverted gas mixture in ammonia synthesis systems is old, and also that the non-circulatory use of nitrogen/hydrogen mixtures containing upwards of 15% methane and other hydrocarbons by volume has heretofore been accompanied by the necessity of bleeding the mixture to waste with evident economic loss of valuable compressed gases and the power used in their compression.

As a further and specific example of the carrying out of my process, reference is made to the accompanying drawing, forming part of this specification, which comprises a flow sheet of an ammonia synthesis system embodying my invention.

In the said drawing, a mixture of hydrocarbons, mainly methane and steam, or methane, air and steam, under a pressure of about 5 lbs. per square inch is forced through pipe 1 into a cracking furnace 2, heated to a temperature of about 1600° F. by jacket 3, into which jacket is forced a mixture of combustible gas and air via pipe 4, which gas mixture burns in said jacket. Cracking furnace 2 contains a catalyst, e. g., comprised of nickel on a suitable support, such as diaspore, to facilitate the conversion of the hydrocarbons and steam into fixed gases. Waste flue gas escapes from the heating jacket via vent pipe 5.

From the cracking furnace 2, the fixed gases, comprising carbon monoxide, hydrogen, carbon dioxide, methane and nitrogen, pass via pipe 6 to carbon monoxide converter 7, which comprises a chamber heated to about 400° C. and containing an iron oxide catalyst. Additional steam enters pipe 6 via pipe 24. From carbon monoxide converter 7 the gases are cooled and pass via pipe 8 to storage vessel 9, escaping, as needed, via valve 10 to line 11, in which they are mixed with suitable quantities of compressed nitrogen arriving from nitrogen storage tank 12 via valve 13, arriving at compressor 14, where the mixed gases are compressed, for example, to about 40 atmospheres, then passed via pipe 15 to carbon dioxide remover 16, wherein the carbon dioxide is removed by solution in water and by alkali, then the gases pass via pipe 17 to a carbon monoxide remover 18. From purifier 18 the gases are then passed via pipe 19 to an ammonia synthesis system 20.

Since the gases entering the ammonia synthesis system contain appreciable quantities of hydrocarbons, e. g., methane, as the hydrogen and nitrogen contents of such gases are removed in the form of ammonia the hydrocarbon content rises by accumulation. When the hydrocarbon content of the gases in the ammonia synthesis system rises to a predetermined point, e. g., 15–30% by volume, I bleed off a portion of such gases and return them via pipe 21 equipped with a suitable pressure reducing valve 25 and pass the bled gases through line 22 equipped with a suitable valve 26 which leads to the supply of hydrocarbon gases which enter the cracking furnace through pipe 1, or, in the alternative, I may pass the gases through line 23 equipped with a suitable valve 27 which leads to the source of fuel gas which enters the cracking furnace jacket through pipe 4.

In the first case, the purged gas mixture entering cracking furnace 2 via pipe 22 passes through the cracking furnace, where its hydrocarbon content is cracked to hydrogen, the rest of the gases, comprising hydrogen and nitrogen passing through unchanged and without loss. In the second case, the purged gas is led to the fuel chamber surrounding cracking furnace 2, where its hydrocarbon content is utilized to produce heat.

In either case, the values of the purged gases are recovered.

It will be appreciated that I do not limit myself to any particular apparatus, merely giving the above by way of example.

What I claim and desire to protect by Letters Patent is:

1. In an ammonia synthesis system of the continuous type wherein hydrocarbons are cracked in a cracking unit to produce hydrogen, carbon monoxide and some uncracked hydrocarbons, the steps which consist in partially purifying the hydrogen to remove the carbon monoxide therefrom, admixing said partially purified hydrogen together with uncracked hydrocarbons with nitrogen and partially catalyzing said mixture to form ammonia, removing ammonia from said mixture, returning the uncatalyzed gases containing from about 15% to about 30% of hydrocarbons to the hydrocarbon cracking unit and cracking the hydrocarbon content thereof together with fresh hydrocarbons in the presence of nitrogen and hydrogen.

2. In an ammonia synthesis system of the continuous type wherein hydrocarbons are cracked in a cracking unit to produce hydrogen and some uncracked hydrocarbons, the steps which consist in admixing said hydrogen and uncracked hydrocarbons with nitrogen and partially catalyzing said mixture to form ammonia, removing ammonia from said mixture, returning the uncatalyzed gases containing from about 15% to about 30% of hydrocarbons to the hydrocarbon cracking unit and cracking the hydrocarbon content thereof together with fresh hydrocarbons in the presence of nitrogen and hydrogen.

JAMES H. SHAPLEIGH.